United States Patent
Kang et al.

(10) Patent No.: US 10,367,562 B2
(45) Date of Patent: Jul. 30, 2019

(54) METHOD OF DETERMINING DOPPLER FREQUENCY TRANSMISSION BEAM IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Kitae Kim, Seoul (KR); Kilbom Lee, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/555,929

(22) PCT Filed: Dec. 16, 2015

(86) PCT No.: PCT/KR2015/013805
§ 371 (c)(1),
(2) Date: Sep. 5, 2017

(87) PCT Pub. No.: WO2016/140425
PCT Pub. Date: Sep. 9, 2016

(65) Prior Publication Data
US 2018/0041262 A1 Feb. 8, 2018

Related U.S. Application Data

(60) Provisional application No. 62/129,017, filed on Mar. 5, 2015.

(51) Int. Cl.
*H04B 7/06* (2006.01)
*H04B 7/0413* (2017.01)

(52) U.S. Cl.
CPC .......... *H04B 7/0617* (2013.01); *H04B 7/063* (2013.01); *H04B 7/0695* (2013.01); *H04B 7/0413* (2013.01)

(58) Field of Classification Search
CPC .... H04B 7/0617; H04B 7/063; H04B 7/0695; H04B 7/0413
(Continued)

(56) References Cited

U.S. PATENT DOCUMENTS 5,175,551 A * 12/1992 Rubin ................... G01S 13/951
342/26 D
8,428,633 B2 * 4/2013 Zhu ....................... H04L 1/0029
455/517

(Continued)

FOREIGN PATENT DOCUMENTS

| KR | 1020080040388 | 5/2008 |
| WO | 2014084694 | 6/2014 |
| WO | 2014123336 | 8/2014 |

OTHER PUBLICATIONS

PCT International Application No. PCT/KR2015/013805, Notification of Transmittal of the International Search Report and the Written Opinion of the International Searching Authority, or Declaration dated Mar. 28, 2016, 14 pages.

*Primary Examiner* — Chieh M Fan
*Assistant Examiner* — Fitwi Y Hailegiorgis
(74) *Attorney, Agent, or Firm* — Lee, Hong, Degerman, Kang & Waimey

(57) ABSTRACT

A method of transmitting a signal, which is transmitted by a transmitting end in a wireless communication system, is disclosed in the present specification. Specifically, the method includes the steps of receiving Doppler information on a plurality of transmission beams from a receiving end; selecting a beam combination using the received Doppler information, wherein the beam combination is selected from (Continued)

a plurality of beam combinations depending on effective Doppler spread values of the beam combinations, wherein each of the beam combinations consists of two or more transmission beams among the plurality of transmission beams; and transmitting the signal to the receiving end using at least one transmission beam included in the selected beam combination.

6 Claims, 8 Drawing Sheets

(58) Field of Classification Search
USPC .......................... 375/299, 298, 295; 370/252
See application file for complete search history.

(56) References Cited

U.S. PATENT DOCUMENTS

| | | |
|---|---|---|
| 2006/0264184 A1 | 11/2006 | Li et al. |
| 2012/0315915 A1 | 12/2012 | Ohm et al. |
| 2014/0105054 A1* | 4/2014 | Sægrov ............... H01Q 3/2605 370/252 |
| 2016/0323898 A1* | 11/2016 | Jo ........................ H04B 7/0617 |

* cited by examiner

METHOD OF DETERMINING DOPPLER FREQUENCY TRANSMISSION BEAM IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/013805, filed on Dec. 16, 2015, which claims the benefit of U.S. Provisional Application No. 62/129,017, filed on Mar. 5, 2015, the contents of which are all hereby incorporated by reference herein in their entirety.

TECHNICAL FIELD

The present invention relates to a wireless communication system, and more particularly, to a system making use of beamforming with multiple beams between two ends of a communication.

BACKGROUND ART

Beamforming techniques are used in wireless communication systems increase throughput and/or density of cells.

Beamforming may be divided into transmission beamforming which is performed by the transmitting side and reception beamforming which is performed by the receiving side. Transmission beamforming generally uses a plurality of antennas and concentrates signals transmitted from respective antennas in a particular direction (that is, space), so as to increase directivity. A set of a plurality of antennas is referred to as an array antenna, and an antenna included in the array antenna is referred to as an antenna element or an array element. The antenna array may be configured in various types such as a linear array and a planar array. When the transmission beamforming is used, the distance of arrival can be increased through a signal directivity increase, and the signal is not transmitted in any direction other than the corresponding direction. As a result, interference influencing another user can be significantly reduced.

The receiving side may perform the reception beamforming by using a reception array antenna. The reception beamforming concentrates received radio waves to be directed in a particular direction, increases sensitivity of signals received from the particular direction, and excludes signals received from another direction, so as to block interference signals.

For future standards, it is expected that Multiple-Input Multiple-Output (MIMO) precoding will be a typical way of implementing beamforming.

MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 1 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 1. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector ŝ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$

[Equation 5]

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Another aspect of future wireless communication standards is that users will expect to enjoy the services in vehicles, i.e. with significant relative speeds between the transmitter and the receiver. The relative speed gives rise to distortions of the radiofrequency spectrum due to the Doppler effect.

In conventional systems, the Doppler effect is considered detrimental and it is compensated by an adjustment of the frequency of local oscillators. Doppler shifts become larger as the carrier frequencies used by wireless systems are higher and higher.

DISCLOSURE

Technical Problem

A new method is proposed to manage wireless communications making use of beamforming when the radio channels undergo Doppler shift.

Technical Solution

In accordance with the purpose of the present invention, as embodied and broadly described, according to one embodiment, a method of transmitting a signal at a transmitting end in a wireless communication system, includes the steps of receiving Doppler information on a plurality of transmission beams from a receiving end; selecting a beam combination using the received Doppler information, wherein the beam combination is selected from a plurality of beam combinations depending on effective Doppler spread value of the beam combinations, wherein each of the beam combinations consists of two or more transmission beams among the plurality of transmission beams, and transmitting the signal to the receiving end using at least one transmission beam included in the selected beam combination.

Preferably, the Doppler information received from the receiving end comprises effective Doppler spread values of different beam combinations. Or, the Doppler information received from the receiving end comprises Doppler shifts of individual beams of the plurality of transmission beams.

In particular, the effective Doppler spread value of a beam combination may correspond to a difference between a maximum Doppler frequency and a minimum Doppler frequency of transmission beams included in said beam combinations.

Preferably, the step of selecting the beam combination can include the step of selecting a beam combination of which the effective Doppler spread value is highest among the beam combinations or the step of selecting a beam combination of which the effective Doppler spread value is lowest among the beam combinations.

More preferably, the method further comprises steps of receiving information on a beam combination preferred by the receiving end among the beam combinations from the receiving end and processing the received information on the preferred beam combination to select the beam combination.

To further achieve these and other advantages and in accordance with the purpose of the present invention, as embodied and broadly described, according to a different embodiment, a transmitter in a wireless communication system includes a wireless communication module (1030) configured to transmit a first signal to a receiver and to receive a second signal from the receiver and a processor (1010) configured to process the second signal including Doppler information on a plurality of transmission beams for selecting a beam combination from a plurality of beam combinations depending on effective Doppler spread values of the beam combinations, wherein each of the beam combinations consists of two or more transmission beams among the plurality of transmission beams, the processor being further configured to control the wireless communication module to transmit the first signal to the receiver using at least one transmission beam included in the selected beam combination.

Preferably, the processor can to select a beam combination of which the effective Doppler spread value is highest among the beam combinations or a beam combination of which the effective Doppler spread value is lowest among the beam combinations.

In the embodiments, the selected beam combination can include a main transmission beam and an alternative transmission beam with which the main transmission beam is to be replaced.

Another aspect of the present invention deals with the reception side. Specifically, there are provided a method and a receiver which report Doppler information to the transmitting end, such that the transmitting end will be enabled to carry out a method as outlined above.

Accordingly, a method of reporting information from a receiving end to a transmitting end in a wireless communication system is provided. The method comprises: receiving a first signal from a transmitting end; processing the received first signal to determine Doppler information on a plurality of transmission beams used by the transmitting end to transmit the first signal; and transmitting a second signal to the transmitting end. The second signal conveys the Doppler information on the plurality of transmission beams.

A receiver in a wireless communication system as proposed herein comprises: a wireless communication module configured to receive a first signal from a transmitter and to transmit a second signal to the transmitter; and a processor coupled to the wireless communication module to determine Doppler information on a plurality of transmission beams used by the transmitter to transmit the first signal. The second signal conveys the Doppler information on the plurality of transmission beams.

Advantageous Effects

According to embodiments of the present invention, it is possible to perform signal transmission and reception optimized for a radio channel status in a manner of more efficiently determining a transmission beam combination through Doppler frequency analysis.

Effects obtainable from the present invention may be non-limited by the above mentioned effect. And, other unmentioned effects can be clearly understood from the following description by those having ordinary skill in the technical field to which the present invention pertains.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Figure 1:
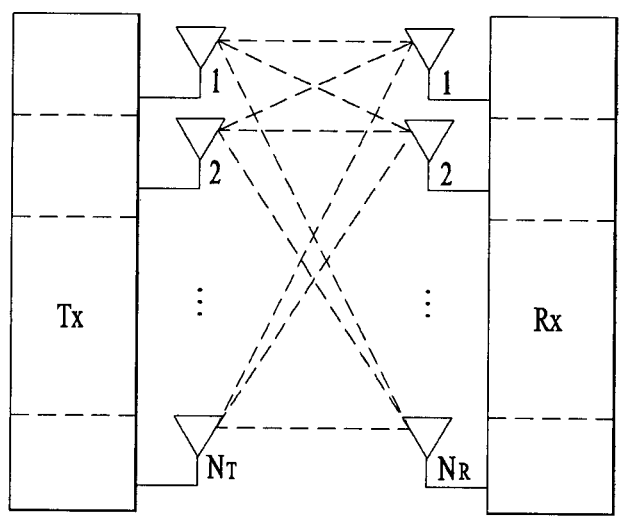
FIG. 1 is a diagram illustrating a configuration of a general MIMO communication system.

Reference will now be made in detail to the preferred embodiments of the present invention, examples of which are illustrated in the accompanying drawings.

Unlike a legacy wireless communication system, a center frequency of an ultrahigh frequency wireless communication system is configured to operate on several GHz to scores of GHz. An ultrahigh frequency characteristic of the center frequency makes worse a Doppler effect appearing according to movement of a user equipment and a carrier frequency offset (hereinafter, CFO) impact occurred due to an oscillator error between a user equipment and a base station. In particular, the Doppler effect has a characteristic of linearly increasing in response to the center frequency. The CFO, which occurs due to the oscillator error between a user equipment and a base station, shows a ppm ($=10^{-6}$) and also has a characteristic of linearly increasing in response to the center frequency.

In a legacy cellular network, in order to solve a problem of the CFO, a base station transmits a synchronization channel and a pilot signal/reference symbol to a user equipment and the user equipment estimates/compensates the CFO using the same. Hence, in the ultrahigh frequency wireless communication, in order to estimate/compensate the CFO of which an offset value is greater than an offset value of the legacy cellular network, it is necessary to transmit a synchronization channel in a different way. For example, as shown in the following, a legacy LTE/LTE-A system regulates an error value of an oscillator between a user equipment and a base station as follows.

A carrier frequency modulated by a UE is compared with a carrier frequency received from an eNB. The carrier frequency modulated by the UE should exist within a range of ±0.1 PPM over a slot, i.e., 0.5 ms.

In the aspect of a base station, a difference between a frequency actually transmitted by the base station and an allocated frequency is defined as a frequency error, i.e., error value. As shown in the following Table 1, accuracy of an oscillator is individually defined according to a type of a base station.

TABLE 1

| BS class | Accuracy |
| --- | --- |
| Wide Area BS | ±0.05 ppm |
| Local Area BS | ±0.1 ppm |
| Home BS | ±0.25 ppm |

Hence, a maximum difference of an oscillator between a base station and a UE corresponds to ±0.1 ppm. If an error occurs in one direction, it may have a maximum offset value of 0.2 ppm. A formula for converting a ppm value into a Hz unit in accordance with each center frequency is to multiply a center frequency by a frequency offset. In this case, a unit corresponds to ppm.

Meanwhile, an impact of a CFO value varies according to subcarrier spacing in an OFDM system. In general, although a CFO value is big, the CFO value has less impact on the OFDM system, which has wide subcarrier spacing. Hence, since it is necessary to represent an actual CFO value (absolute value) by a relative value making an impact on the OFDM system, it is possible to represent a CFO value by a normalized CFO of which the CFO value is divided by subcarrier spacing. Table 2 in the following shows each center frequency, a CFO value for an error value of an oscillator and a normalized CFO.

TABLE 2

| Center frequency | Oscillator Offset | | | |
|---|---|---|---|---|
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

Referring to Table 2, in case of 2 GHz, subcarrier spacing (15 kHz) used in LTE Rel-8/9/10 is assumed. In case of 30 GHz and 60 GHz, subframe spacing (104.25 kHz) is assumed to avoid performance degradation in consideration of Doppler effect for each center frequency. Yet, this is just an example. It is apparent that a different subcarrier spacing is applicable on each center frequency.

Meanwhile, a Doppler spread phenomenon plays a big part in a situation that a user equipment moves fast or a situation that the user equipment slowly moves on a high frequency band. Doppler spread causes spread in frequency domain and generates distortion of a signal as a result. The Doppler spread can be represented as Equation 8 in the following.

$$f_{doppler} = (v/\lambda)\cos\theta \qquad \text{[Equation 8]}$$

In Equation 8, v corresponds to a moving speed of a user equipment and λ corresponds to a wavelength of a center frequency of a radio wave transmitted by a base station or a user equipment. And, θ corresponds to an angle between a received radio wave and moving direction of a user equipment. For clarity of explanation, assume that θ corresponds to 0.

In this case, coherence time $T_c$ has such a relation as $$T_c \approx \frac{1}{f_{doppler}}.$$

If time interval of which a correlation value of a channel response is equal to or greater than 50% is defined as the coherence time in time domain, it is possible to represent the coherence time as $$T_c \approx \frac{9}{16\pi f_{doppler}}.$$

In a wireless communication system, coherence time shown in the following Equation 9 and a Doppler spread relation are mainly used using a geometric mean of the aforementioned two formulas.

$$T_c = \sqrt{\frac{9}{16\pi f_{doppler}}} = \frac{0.423}{f_{doppler}} \qquad \text{[Equation 9]}$$

Doppler power spectrum density (hereinafter, Doppler spectrum) may have various shapes. In general, if a signal received in such environment of many scattering as a downtown area is received by same power in all directions, the Doppler spectrum has a U-shape.

Figure 2:
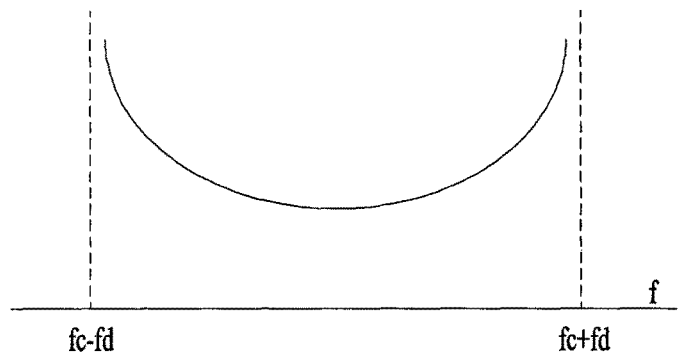
FIG. 2 is a diagram for an example of a Doppler spectrum.

FIG. 2 is a diagram for an example of a Doppler spectrum. In particular, FIG. 2 shows an example of Doppler spectrum having a U-shape when a center frequency corresponds to $f_c$ and a maximum Doppler spread value corresponds to $f_d$.

Since an ultrahigh wireless communication system is positioned at a band of which a center frequency is very high, the system has a merit in that a size of an antenna is small and a plurality of antennas can be installed in a small space. The merit enables pin-point beamforming (pencil beamforming, delicate beamforming or the like) to be performed using dozens or hundreds of antennas. The pin-point beamforming indicates that a signal is not received in a same direction but received in a prescribed angle only.

Figure 3:
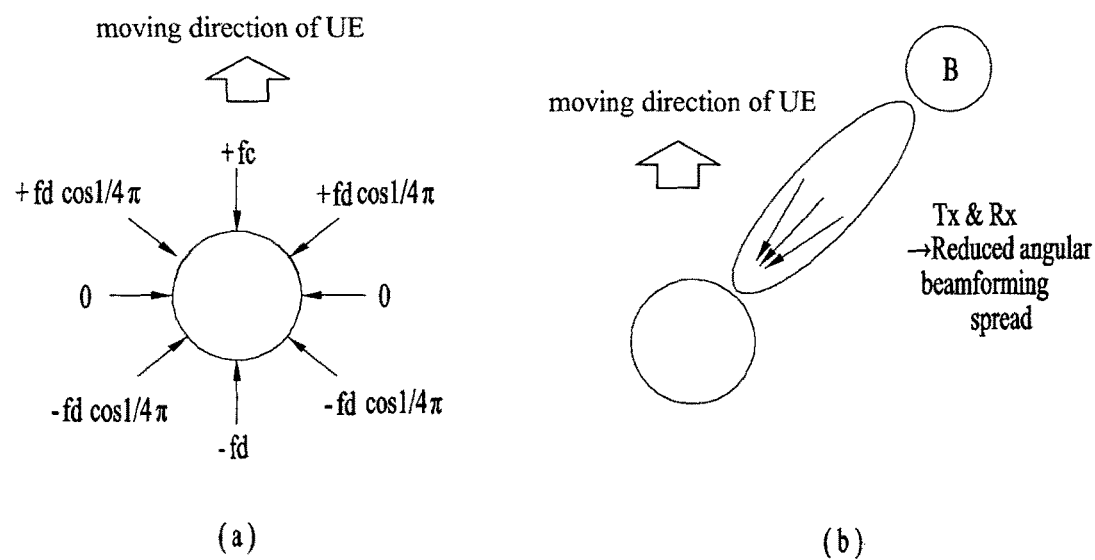
FIG. 3 is a diagram for explaining a concept of pin-point beamforming.

FIG. 3 is a diagram for explaining a concept of pin-point beamforming. In particular, FIG. 3(a) shows a Doppler spread value according to movement of a user equipment and FIG. 3(b) shows a case of performing pin-point beamforming using a plurality of antennas of signals received in a same direction of which a legacy Doppler spectrum has a U-shape. If the pin-point beamforming is performed according to what is mentioned above, the Doppler spectrum does not have the U-shape due to a reduced angular spread and it may have Doppler spread on a prescribed band only.

Figure 4:
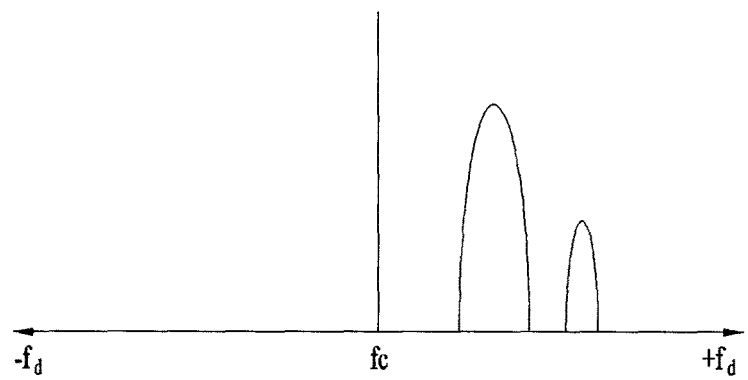
FIG. 4 is a diagram for an example of a Doppler spectrum when pin-point beamforming is performed.

FIG. 4 is a diagram for an example of a Doppler spectrum when pin-point beamforming is performed. In particular, FIG. 4 shows Doppler spectrum when pin-point beamforming is performed or when a signal received by a receiver is not received in a same direction but is received in a narrow angle only.

Meanwhile, a future wireless communication system has homework for providing various services including a heterogeneous communication requirement. For example, there exists a first type of service to be transmitted with very low delay without an error as a remote medical service, whereas there may exist a second type of service of which a requirement for delay or reliability is relatively low and the service requiring high capacity transmission as a hologram image transmission service.

Moreover, it is expected that a type of a terminal is to be diversified from a current smartphone focus. For example, it is anticipated that an industrial robot, a drone, a vehicle and the like are going to perform communication via a mobile communication network. In particular, after a concept of a network-connected car (connected car) is introduced, a car is rising up as a mobile communication terminal of a new type together with advancement of a recent autonomous driving technology.

In case of a vehicle communication service, a high data rate of a communication link is important for a vehicle information service, whereas low latency, high reliability, security and the like of a communication link are more important for a vehicle safety service.

The present invention proposes a method of determining a beam for performing beamforming or precoding suitable for a service/technical requirement required by a moving terminal or a method of determining a precoder.

Figure 5:
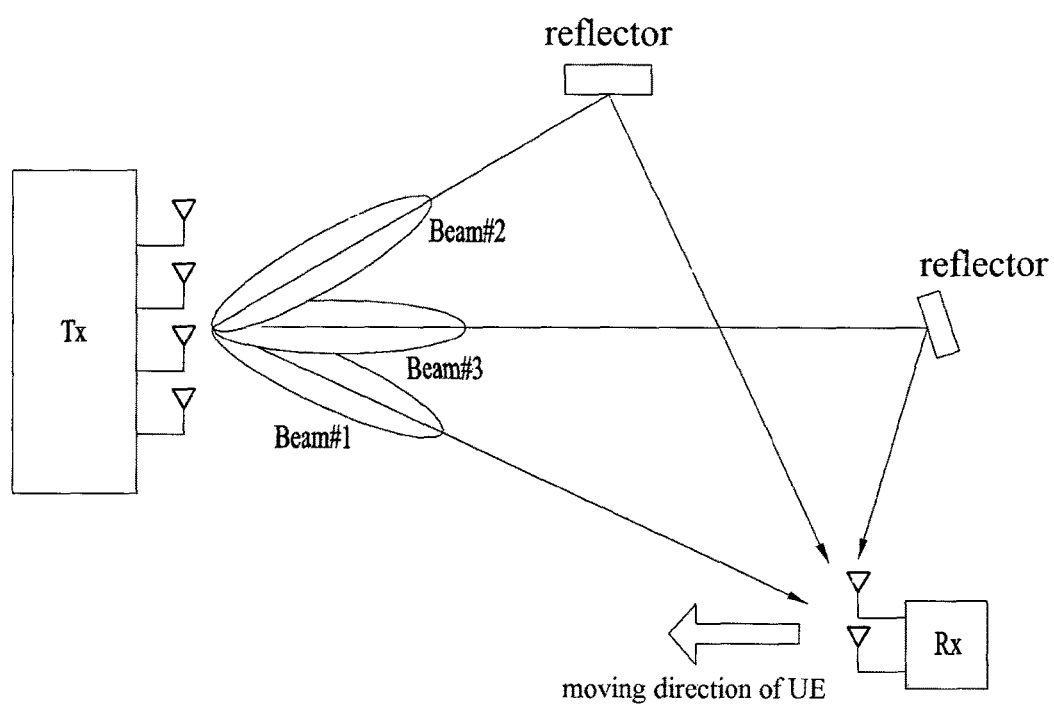
FIG. 5 is a diagram for an example of a signal transmission status to which the present invention is applied and a transmitter structure.

FIG. 5 is a diagram for an example of a signal transmission status to which the present invention is applied and a transmitter structure. In particular, in FIG. 5, assume that a radio channel between a transmitter and a receiver exists as three rays or ray clusters.

If the maximum number of beams capable of being simultaneously transmitted corresponds to 2 according to a limitation on the number of antennas and the number of RF chains, a transmitter can select one from maximum 6 methods in selecting a beam.

Number of transmission beam: 1 or 2
Combination of simultaneously transmitted beams
(1) 3 methods when the number of beams corresponds to 1: {B1}, {B2}, {B3}
(2) 3 methods when the number of beams corresponds to 2: {B1, B2}, {B1, B3}, {B2, B3}

In the past, when a beam is selected and a related signal is processed (e.g., precoding), utilizing a difference of Doppler spectrum of each ray (cluster) is not considered. This is because the Doppler spectrum isolation phenomenon shown in FIG. 4 does not appear on a low frequency band. Although the phenomenon appears, the extent of the phenomenon is weak.

Yet, as wireless communication technologies utilizing a band equal to or greater than 10 GHz are recently considered, it is expected that a difference of Doppler spectrum is to be remarkable according to each ray (cluster) on the channel. For example, Doppler spectrum for each ray in FIG. 5 is highly probable to be clearly distinguished from each other as shown in FIG. 6.

Figure 6:
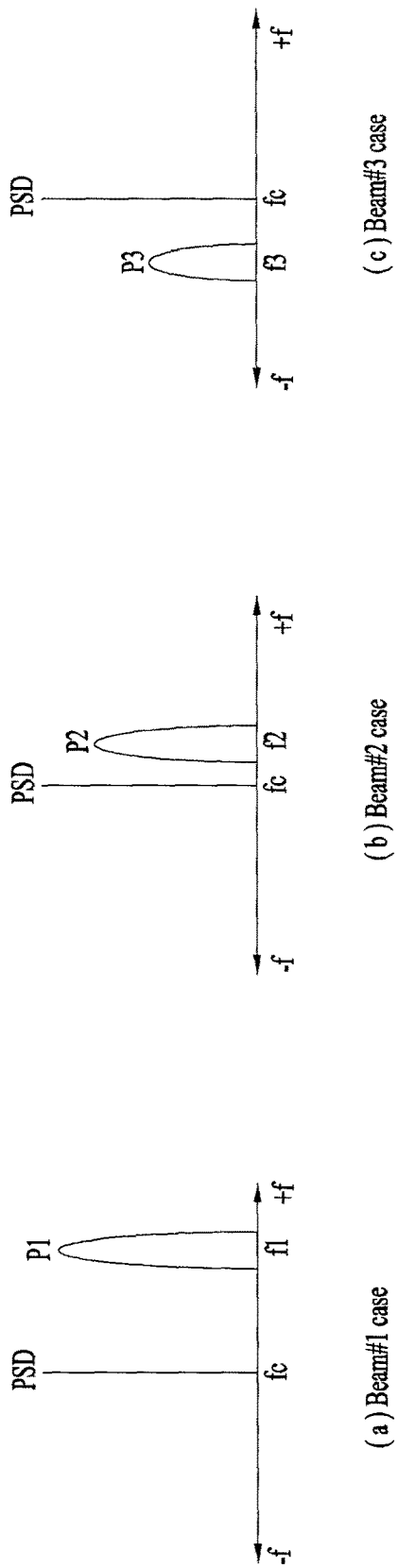
FIG. 6 is a diagram for a Doppler spectrum difference according to movement of a user equipment on a high frequency band.

FIG. 6 is a diagram for a Doppler spectrum difference according to movement of a user equipment on a high frequency band.

If a channel characteristic is shown as FIG. 6, unlike a legacy system, an effective Doppler spread characteristic may change by the selection of a transmission beam group in terms of wireless transmission. Regarding this, it shall be described with reference to drawing in the following.

Figure 7:
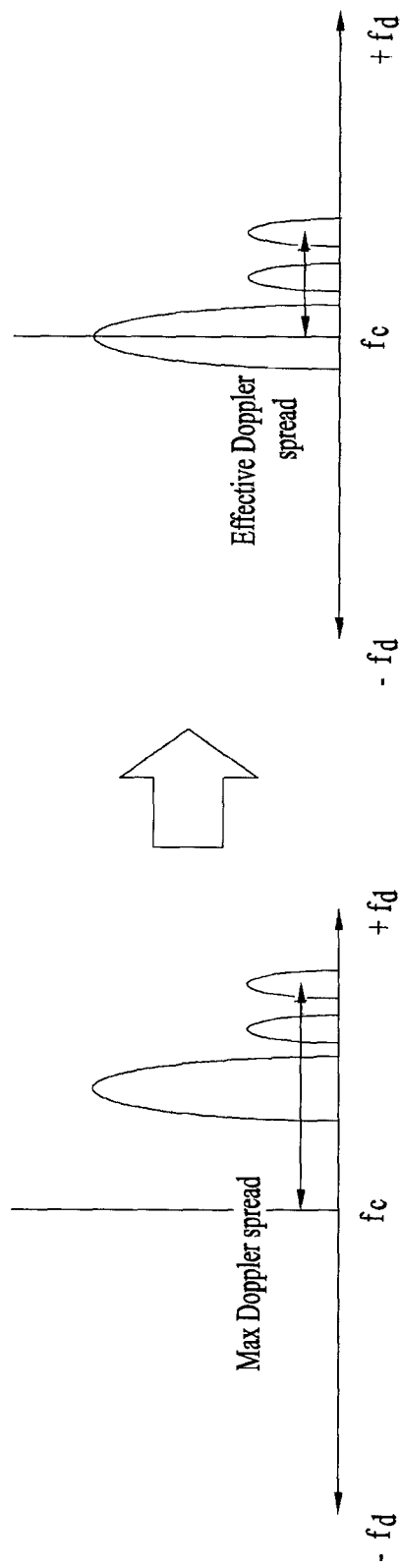
FIG. 7 is a diagram for an example of a concept for compensation and effect when Doppler isolation occurs.

FIG. 7 is a diagram for an example of a concept for compensation and effect when Doppler isolation occurs. Referring to FIG. 7, if Doppler isolation occurs, compensation can be performed in a manner of measuring a Doppler shift value and it is possible to know that effective Doppler spread is reduced.

If the effective Doppler spread is reduced, it may have a merit in that time selectivity becomes relatively smaller and overhead (e.g., pilot density, feedback interval, etc.) for channel estimation is reduced. On the contrary, if the effective Doppler spread is reduced, time diversity effect is reduced and outage performance (or reliability) may be degraded. In particular, a trade-off between a resource efficiency and outage performance may occur by the effective Doppler spread. If it is assumed that it is possible to relatively reduce system overhead by enhancing resource efficiency and improve average system performance, a relation of the aforementioned trade-off can also be interpreted as a relation between average performance and outage performance or a relation between throughput and reliability.

Based on the aforementioned discussion, embodiments of the present invention propose that a transmitter utilizes information on the effective Doppler spread as follows when the transmitter determines a transmission beam combination. In this case, the effective Doppler spread indicates (maximum Doppler−minimum Doppler) in a Doppler spectrum consisting of values of which PSD (power spectrum density) is equal to or greater than a specific threshold.

1. High reliability first→High priority is assigned to high effective Doppler spread (first type of service).
2. Low overhead (or high-throughput) first→High priority is assigned to low effective Doppler spread (second type of service).

If high priority is assigned to high effective Doppler spread, it is possible to naturally have an effect of reducing probability of signal outage due to signal block. When an angle between moving direction of a receiver and a ray corresponds to θ, a Doppler value is proportional to cos (θ). Hence, it might be said if the effective Doppler spread is wider, a difference between incidence angles of rays is greater. In this case, although a signal is suddenly blocked in specific direction for a mobile receiver, one may anticipate an effect of enhancing probability of not blocking a different signal.

In other words, the selection scheme used by the transmitter will typically lead to selection of a beam combination having a higher effective Doppler spread value for services of the first type (high reliability/overhead) than for services of the second type.

Figure 8:
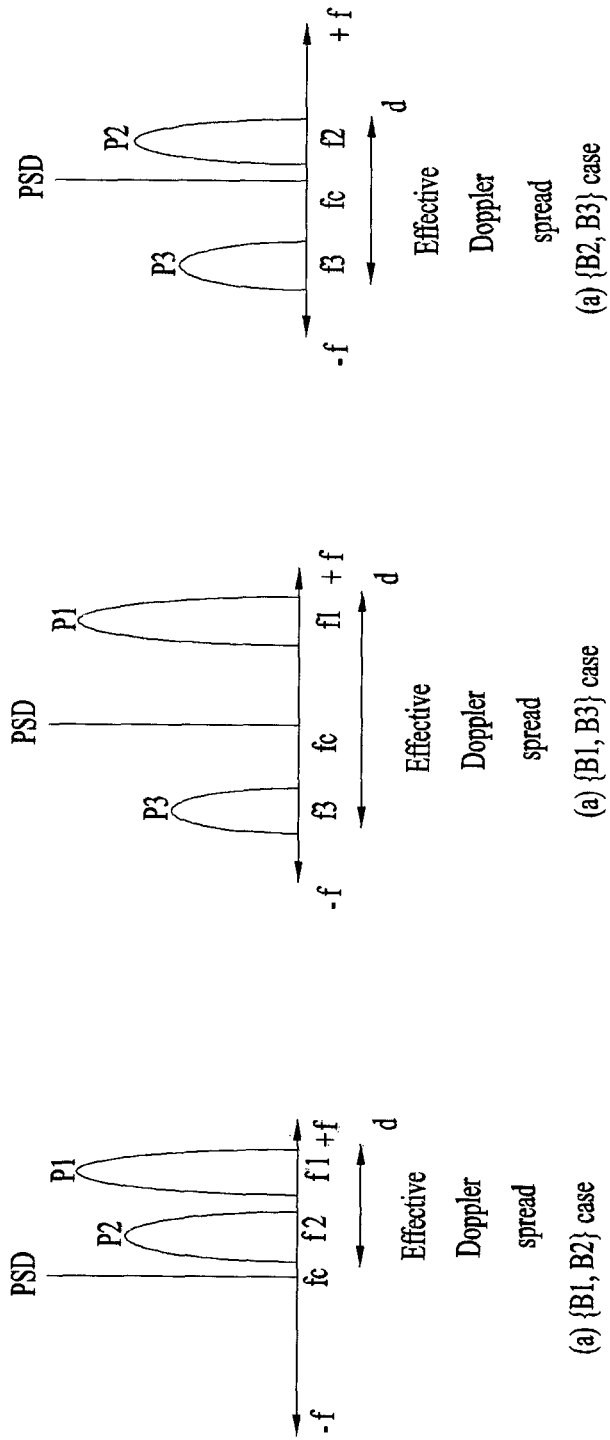
FIG. 8 is a diagram for an example of utilizing effective Doppler spread information when a transmission beam combination is determined according to embodiment of the present invention.

FIG. 8 is a diagram for an example of utilizing effective Doppler spread information when a transmission beam combination is determined according to embodiment of the present invention. In particular, in FIG. 8, assume a case that high priority is assigned to high effective Doppler spread to increase reliability of a transmission signal in the example of FIG. 5 and FIG. 6.

If two beams are selected instead of a single beam, effective Doppler spread may become greater. In the number of cases of selecting two beams, as shown in FIG. 8, if a {B1, B3} combination is selected, the effective Doppler spread may become greatest. Hence, a transmitter will select the beam combination.

Figure 9:
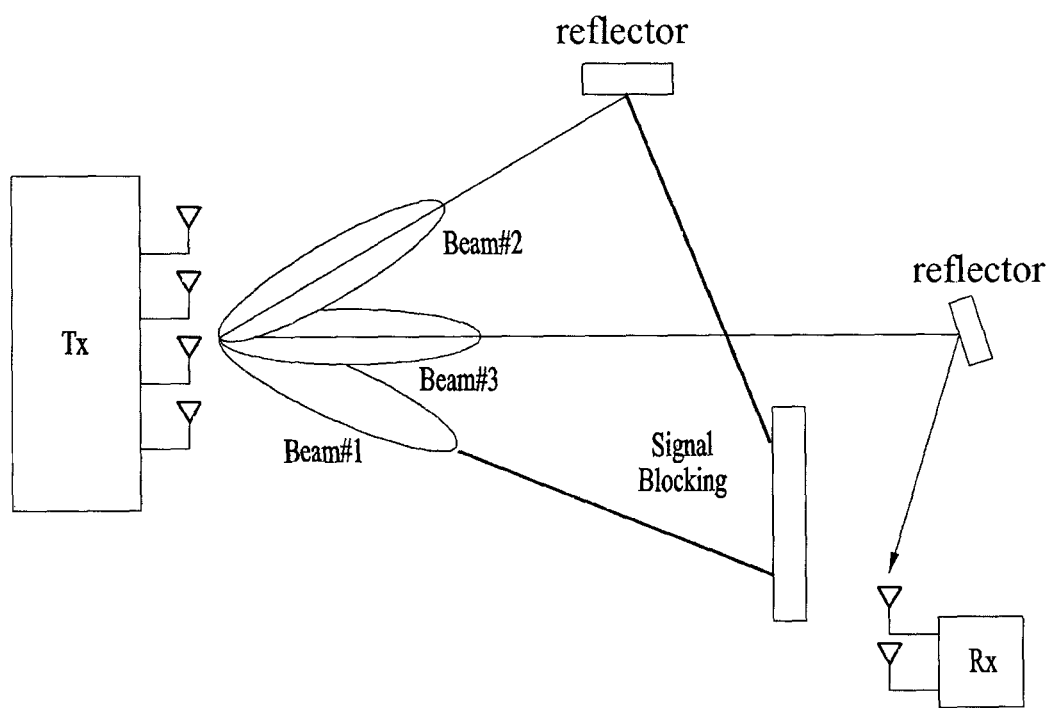
FIG. 9 is a diagram for an example of transmitting a signal when a transmission beam combination is determined according to embodiment of the present invention.

FIG. 9 is a diagram for an example of transmitting a signal when a transmission beam combination is determined according to embodiment of the present invention. Since a beam combination, which is selected according to an embodiment of the present invention, corresponds to a beam combination of a form that each ray (cluster) is fully distributed, as shown in FIG. 9, although a ray cluster #1 and #2 are blocked at the same time by a specific object, it is still possible to select a beam combination capable of maintaining communication, because a signal of a ray cluster #3 at which a beam 3 is aiming is alive.

Meanwhile, in terms of SNR, SINR, throughput or capacity, the {B1, B3} combination may not correspond to a best beam combination. In the aspect of simultaneous transmission of two beams, a {B1, B2} combination may correspond to a best combination in terms of capacity since the {B1, B2} combination has less inter-beam interference and a power gain (e.g., a P2 value in FIG. 6) corresponding to B2 may be greater than a power gain (e.g., a P3 value in FIG. 6) corresponding to B3. In order to improve throughput by reducing channel estimation overhead via a Doppler compensation technology, a transmission scheme of selecting a single beam may be more advantageous.

When transmission is performed using two specific beams, if an event for blocking an $i^{th}$ beam corresponds to $B_i$ and an event for not blocking corresponds to $B_i^C$, a probability of not transmitting a data packet can be calculated as Equation 10 in the following.

$$P_e = Pr(\text{error}|B_1, B_2)Pr(B_1, B_2) + Pr(\text{error}|B_1, B_2^C)Pr(B_1, B_2^C) + Pr(\text{error}|B_1^C, B_2)Pr(B_1^C, B_2) + Pr(\text{error}|B_1^C, B_2^C)Pr(B_1^C, B_2^C)$$ [Equation 10]

In general, such a relation as Equation 11 in the following can be established.

$$Pr(\text{error}|B_1, B_2) \gg Pr(\text{error}|B_1, B_2^C),$$
$$Pr(\text{error}|B_1^C, B_2) \gg Pr(\text{error}|B_1^C, B_2^C)$$ [Equation 11]

For a service requiring very high reliability, transmission can be performed to have a value $Pr(\text{error}|B_1^C, B_2^C)$ close to 0 using a modulation scheme and coding schemes. (e.g., $Pr(\text{error}|B_1^C, B_2^C) = 10^{-6}$) Yet, in this environment, as getting close to a high frequency band on which a pathloss difference between LoS and NLoS is severe, a $Pr(\text{error}|B_1, B_2)$ value is getting close to 1. Hence, a value for most considerably influencing on a total error probability may become $Pr(B_1, B_2)$ corresponding to a probability of blocking both beams.)

If it is assumed that the probability $Pr(B_1, B_2)$ is identical to $Pr(B_2|B_1)Pr(B_1)$ and a probability of blocking a single beam is identical to each other irrespective of a beam ($Pr(B_1) = Pr(B_2) = $ Constant), when a single beam is blocked, it is possible to know that the total error probability is to be determined according to a probability of blocking a different beam at the same time. Consequently, when a single beam is blocked, the present invention may correspond to a method of finding out a beam combination of which a probability of blocking a different beam at the same time is lowest via Doppler spectrum analysis.

Meanwhile, in selecting a beam, it is not mandatory to use Doppler spread only. It is possible to select a beam combination in a manner of considering a power gain value for each beam combination, a data transmission speed, interference amount for a different receiver/cell and the like together. In addition, in order to apply the present invention, it is necessary to understand a characteristic of the Doppler spread. To this end, it is possible to utilize various schemes. For example, it may use a method of directly obtaining Doppler spectrum by performing FFT on auto-correlation of a reception signal. Or, the extent of a relative Doppler shift may be inferred from a frequency offset value estimated in a process of frequency synchronization. This is because a frequency offset value is changeable according to a Doppler shift phenomenon.

In order to apply the present invention, the present invention proposes that a receiver provides a transmitter with information on effective Doppler spread or information corresponding to the information on the effective Doppler spread. Examples of the information are described in the following.

(A) Doppler shift according to a beam (combination)/ Doppler spread information

Doppler spread effective value, maximum Doppler shift, information on increase/decrease of Doppler shift value on the basis of a specific value (e.g., whether a shift value is a positive value (+) or a negative value (−) on the basis of fc) and a relative Doppler shift value (B) Frequency offset information according to a beam (combination)

Oscillator setting value according to a beam (combination), CFO value, etc.

(C) Doppler shift (requested by a network)/beam combination information satisfying a requirement related to Doppler spread Information on a beam combination of which Doppler spread is greatest (e.g., a precoder index set, channel quality information, etc.), information on beams (combination) aligned on the basis of effective Doppler spread, information on beam (combination) appropriate for each service type or quality requirement (D) Doppler shift according to a beam (combination)/ power information on Doppler spread P1, P2 and P3 value in FIG. 6 and/or a gain value in FIG. 7 in case of transmitting two beams at the same time In order to apply the present invention, a transmitter can inform a receiver of a requirement for selecting a beam or a service type. In particular, as an example for the requirement for selecting a beam, it is possible to transmit a threshold for an effective Doppler spread value as control information. In this case, a user equipment can select/report a beam combination equal to or greater than the threshold or a beam combination equal to or less than the threshold. As a different example, control information is configured to select a beam combination of which an effective Doppler spread value is equal to or greater/less than a top/bottom effective Doppler spread value from various beam combinations. Having received the control information, a user equipment can select/report a beam combination on the basis of a corresponding criteria.

If a criterion for selecting a beam is not provided by a base station, a user equipment may transmit all beam (combination) information according to an available service type. For example, if a user equipment anticipates that two types of services (or requirements) are mainly available, the user equipment can feedback a service type/requirement information together when feedback on preferred beam (combination) information is performed. For example, feedback can be performed in such a form as a beam combination (x1, x2) for a type 1 service or a beam combination (x3, x4) for a type 2 service.

In the present invention, when a method of transmitting a plurality of beams at the same time is performed, it is not mandatory to have a plurality of RF chains. A coefficient for a single beam can be generated by a combination of a plurality of beams.

For example, in case of 4 transmission antennas, if a beamforming coefficient for a first beam corresponds to $[x_{11}\ x_{12}\ x_{13}\ x_{14}]$ and a beamforming coefficient for a second beam corresponds to $[x_{21}\ x_{22}\ x_{23}\ x_{24}]$, in order to transmit two beams via a single RF chain, a beamforming coefficient can be configured as $0.5*[x_{11}+x_{21}\ x_{12}+x_{22}\ x_{13}+x_{23}\ x_{14}+x_{24}]$. By doing so, it is possible to transmit a single data stream in two beam directions and configure a beam coefficient in a form of improving reliability and throughput via the proposed technology.

Although the present invention shows an example of transmitting a plurality of beams in a single antenna array, an identical principle and technology can also be applied to a case of transmitting a single beam according to a partial antenna array. In this case, each beam can be applied as a transmission beam of each sub-array. And, the present invention can be utilized for combining a random transmitter and a receiver with each other. The present invention can be applied to various environments such as downlink when a transmitter corresponds to a base station and a receiver corresponds to a user equipment, uplink when the transmitter corresponds to the user equipment and the receiver corresponds to the base station, and a D2D link when the transmitter corresponds to the user equipment and the receiver corresponds to the user equipment.

The method of selecting a beam combination consisting of a plurality of beams proposed by the present invention can be utilized not only for the purpose of using a plurality of the beams at the same time but also for the purpose of selecting an alternative beam. In this case, the alternative beam can be configured to perform fast beam switching in case of performing retransmission when quality of a main beam used for transmitting a signal is radically degraded by blocking and the like. When the alternative beam is selected, as mentioned earlier in the contents of the present invention, it is possible to select a combination of which a difference between a Doppler shift value of the main beam and a Doppler shift value of the alternative beam is greatest to utilize for improving reliability of a link. By doing so, although a plurality of beams are selected, there may exist a single beam only used for actual transmission on specific time.

The present invention can be applied to both beamforming through analog or digital processing processed on multiple antennas and precoding. If the feedback information is applied to a wideband system, it is possible to feedback a separate feedback information set on each frequency domain in a manner of dividing the wideband system into specific frequency domains (e.g., subband, subcarrier, resource block, etc.). Or, feedback information can be transmitted to a specific frequency domain selected by a user equipment or a specific frequency domain designated by a base station only. The frequency domain can be configured by one or more contiguous frequency domains or non-contiguous frequency domains.

Figure 10:
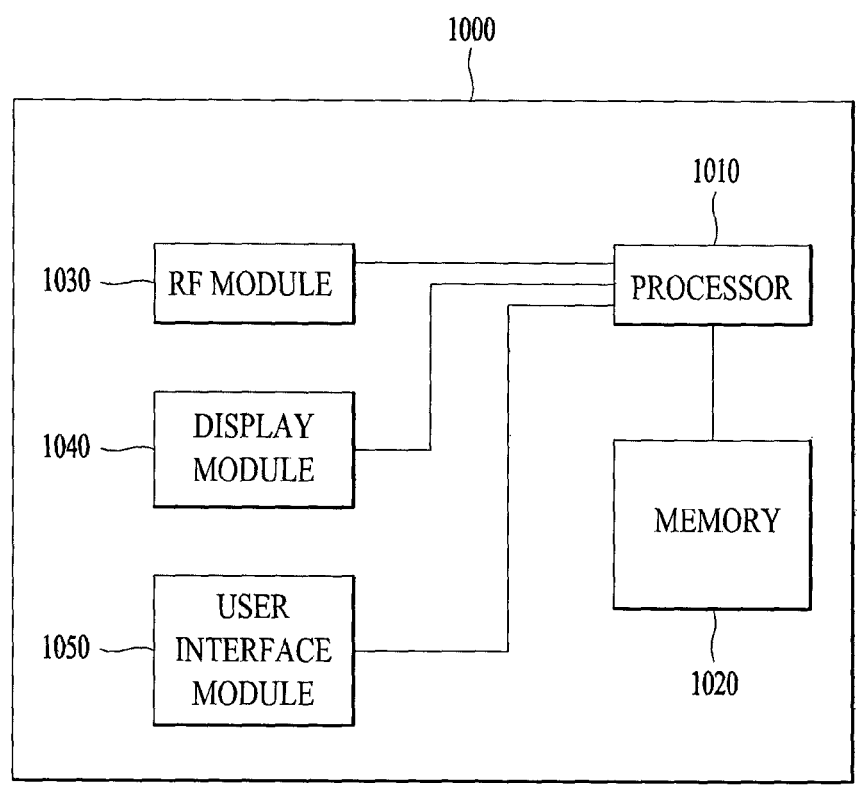
FIG. 10 is a block diagram of a communication apparatus according to an embodiment of the present invention.

FIG. 10 is a block diagram of a communication apparatus according to an embodiment of the present invention. Such apparatus may form part of the transmitting end in the method described above. A similar apparatus may form part of the receiving end.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method of transmitting a signal at a transmitting end in a wireless communication system, the method comprising:

receiving Doppler information about a plurality of transmission beams from a receiving end;

selecting a beam combination using the received Doppler information, wherein the beam combination is selected from a plurality of beam combinations depending on effective Doppler spread values of the plurality of beam combinations, wherein each of the plurality of beam combinations comprises two or more transmission beams among the plurality of transmission beams; and transmitting the signal to the receiving end using at least one transmission beam included in the selected beam combination, wherein the effective Doppler spread value of a beam combination corresponds to a difference between a maximum Doppler frequency and a minimum Doppler frequency of transmission beams included in the beam combination, wherein service types include a first service type for prioritizing reliability and a second service type for prioritizing throughput, when a service type of the transmitted signal is the first service type, selecting the beam combination comprises selecting a beam combination having a highest effective Doppler spread value from the plurality of beam combinations, and when the service type of the transmitted signal is the second service type, selecting the beam combination comprises selecting a beam combination having a lowest effective Doppler spread value from the plurality of beam combinations.

2. The method of claim 1, further comprising:

receiving, from the receiving end, information about a beam combination preferred by the receiving end among the plurality of beam combinations; and processing the received information about the preferred beam combination to select the beam combination.

3. The method of claim 1, wherein the selected beam combination comprises a main transmission beam and an alternative transmission beam with which the main transmission beam is to be replaced.

4. A transmitter in a wireless communication system, the transmitter comprising:

a wireless communication module configured to transmit a first signal to a receiver and to receive a second signal from the receiver; and a processor configured to process the second signal including Doppler information about a plurality of transmission beams for selecting a beam combination from a plurality of beam combinations depending on effective Doppler spread values of the plurality of beam combinations, wherein each of the plurality of beam combinations comprises two or more transmission beams among the plurality of transmission beams, the processor being further configured to control the wireless communication module to transmit the first signal to the receiver using at least one transmission beam included in the selected beam combination, wherein the effective Doppler spread value of a beam combination corresponds to a difference between a maximum Doppler frequency and a minimum Doppler frequency of transmission beams included in the beam combination, wherein service types include a first service type for prioritizing reliability and a second service type for prioritizing throughput, when a service type of the transmitted signal is the first service type, selecting the beam combination comprises selecting a beam combination having a highest effective Doppler spread value from the plurality of beam combinations, and when the service type of the transmitted signal is the second service type, selecting the beam combination comprises selecting a beam combination having a lowest effective Doppler spread value from the plurality of beam combinations.

5. The transmitter of claim 4, wherein the processor further:

receives, from the receiving end, information about a beam combination preferred by the receiving end among the plurality of beam combinations; and processes the received information about the preferred beam combination to select the beam combination.

6. The transmitter of claim 4, wherein the selected beam combination comprises a main transmission beam and an alternative transmission beam with which the main transmission beam is to be replaced.

* * * * *